United States Patent [19]
Iwao

[11] Patent Number: 5,823,600
[45] Date of Patent: Oct. 20, 1998

[54] NOISE INSULATING WALL STRUCTURE

[75] Inventor: Keijiro Iwao, Kanagawa-ken, Japan

[73] Assignee: Nissan Motor Co., Ltd., Yokohama, Japan

[21] Appl. No.: 779,888

[22] Filed: Jan. 7, 1997

[30] Foreign Application Priority Data

Jan. 24, 1996 [JP] Japan .................................... 8-010360

[51] Int. Cl.⁶ .................................................. B62D 33/00
[52] U.S. Cl. .......................................... 296/39.3; 181/290
[58] Field of Search ........................... 296/39.3; 181/290, 181/294

[56] References Cited

FOREIGN PATENT DOCUMENTS 2 019 937  11/1979  Germany.
2 276 224   9/1994  Germany.

*Primary Examiner*—Jesus D. Sotelo
*Attorney, Agent, or Firm*—Foley & Lardner

[57] ABSTRACT

A noise insulating wall structure comprises a pair of noise insulating plates which face each other so as to be apart from another and each of which has a plurality of through holes. The noise insulating plates are connected to each other by means of a plurality of cylindrical portions. Each of the cylindrical portions is divided into two half portions, each of which has an abutting portion on the end face thereof. At least one of the abutting portions of the two half portions has a plurality of notched portions, each establishing the communication between the inside and outside of the cylindrical portion. The air layer at the central portion in the cylindrical portion serves as an air mass to form a vibration system of one-degree of freedom. In addition, the outside air layers in the through holes serve as air masses and the inside air layer in the cylindrical portion serves as an air spring to form a vibration system of two-degrees of freedom. The frequency characteristic is designed to be easily adjusted by varying the number, size and shape of the notched portions.

32 Claims, 14 Drawing Sheets

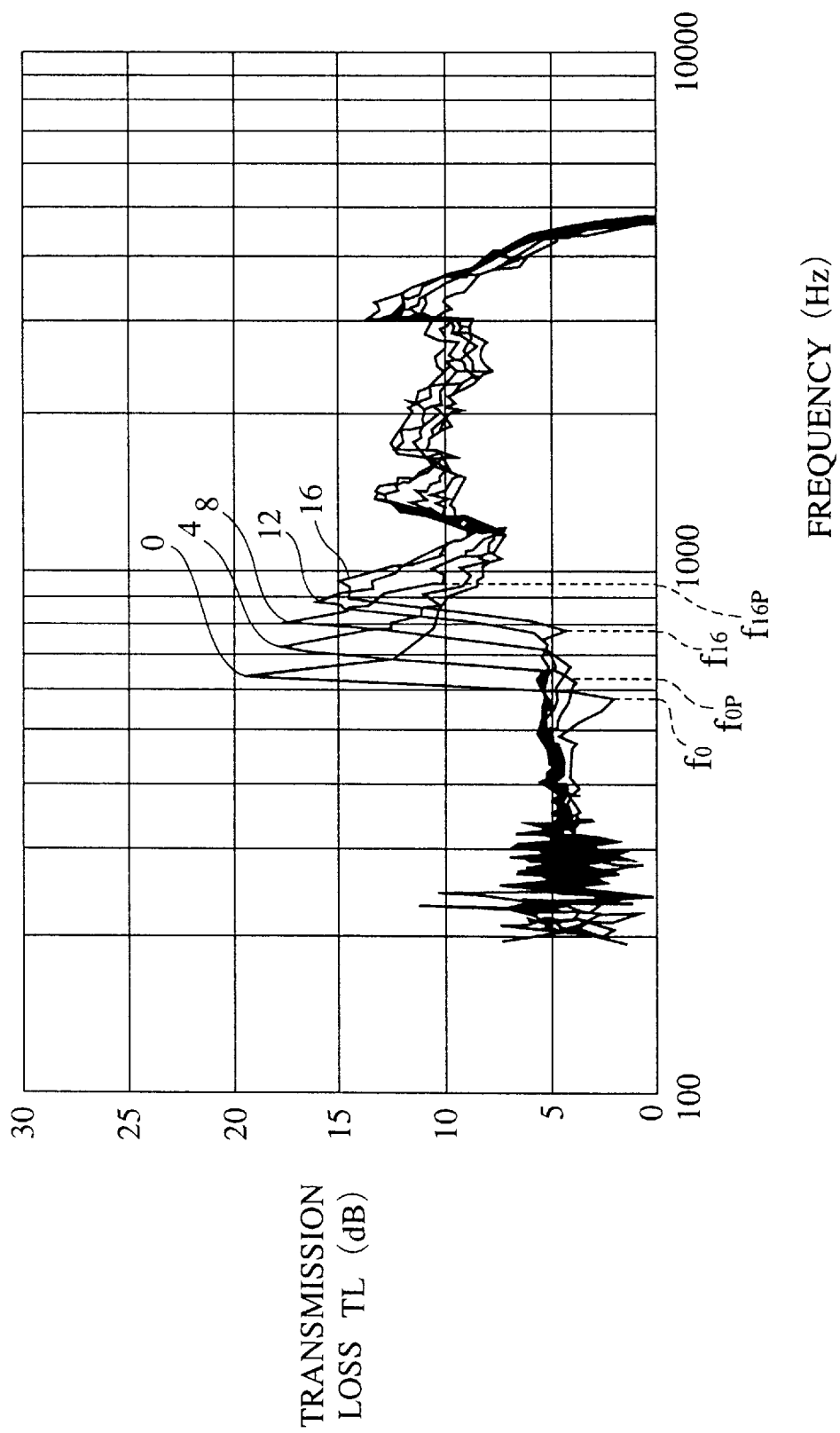

WHEN s IS VARIED (β=0.75)

WHEN β IS VARIED (s=25)

FIG. 15B  FIG. 15A
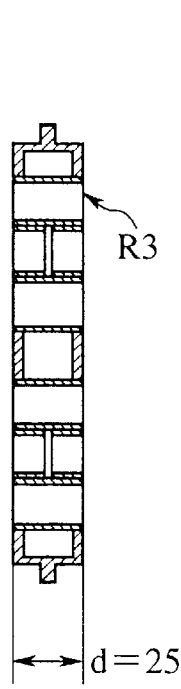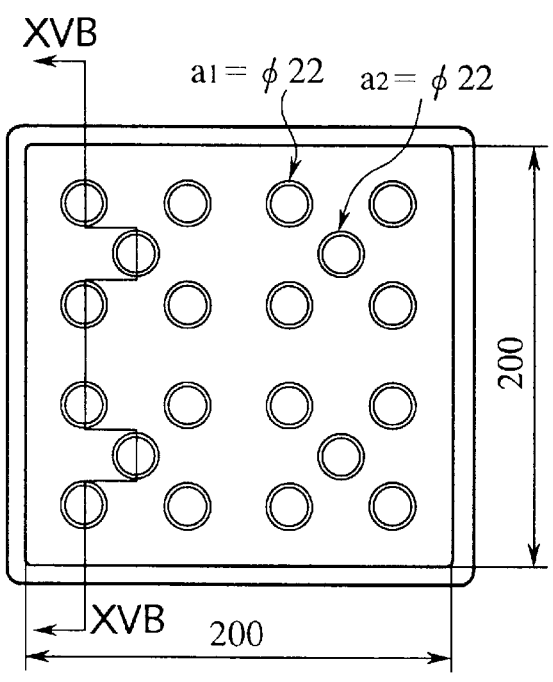
FIG. 16
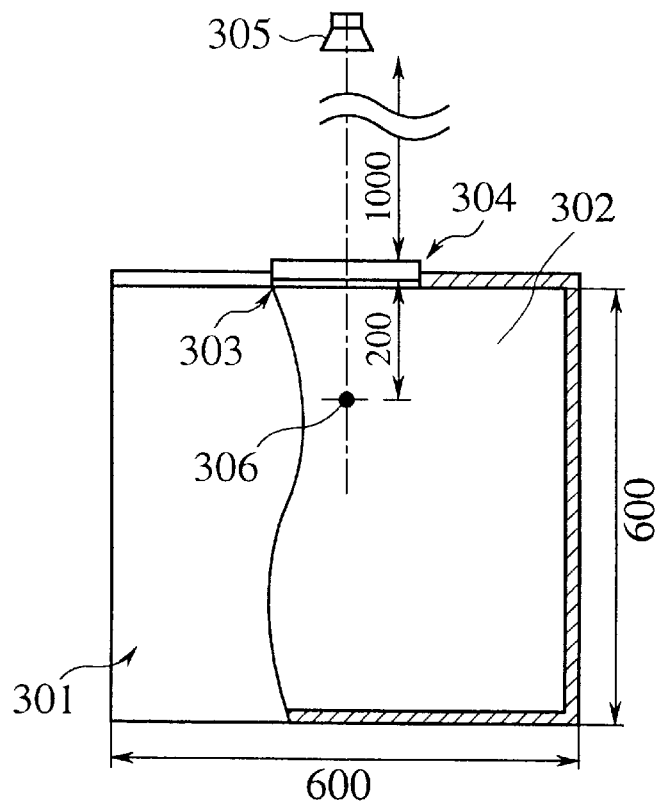

NOISE INSULATING WALL STRUCTURE

BACKGROUND OF THE INVENTION

1. Technical Field

The present invention relates to a noise insulating wall structure which has noise insulating effects while maintaining permeability and which can easily adjust frequency characteristics.

2. Description of the Related Art

An under cover is typically mounted on the lower portion of an engine room of an automotive vehicle. Such an under cover is designed to improve aerodynamic characteristics at the lower portion of the engine room and to protect components in the engine room from rocks and so forth. The under cover also serves as a noise insulating wall for restraining noises emitted from the engine room to the outside of the vehicular body. As the area of the under cover, the effect of the under cover serving as a noise insulating wall increases.

However, if the area of the under cover increases, atmospheric temperature in the engine room increases since the area of the under cover enclosing the lower portion of the engine room increases. Thus, the under cover of the engine room must be designed in view of restraint of noises as well as of the increase of atmospheric temperature.

An improved noise insulating wall structure incorporated in an under cover is shown in Japanese patent application No. 5-322041 which was filed by the assignee of the present invention (the disclosure of which is hereby incorporated by reference herein). This noise insulating wall structure comprises a pair of noise insulating plates which are opposed to each other at an interval and each of which has a plurality of through holes.

The noise insulating wall structure also has a plurality of straight-tubular cylindrical portions which have substantially the same inner diameter as those of some of the through holes. The cylindrical portions are associated with the some of the through holes to form continuous holes for establishing the communications between the some of the through holes of one of the noise insulating plates and the corresponding through holes of another noise insulating plate. Air in each of the continuous holes serves as an air mass to form a vibration system of one-degree of freedom consisting of only a mass which receives periodically varying sound pressure as external form to vibrate.

In addition, the noise insulating wall structure has a plurality of extending portions projecting from the open edges of the residual through holes, which are not communicated with the cylindrical portions, of the noise insulating plates to the inner space between the noise insulating plates. Moreover, an air chamber is defined around the extending portions between the noise insulating plates. Air in each of the extending portions serves as an air mass and the air layer in the air chamber serves as an air spring to form a vibration system of two-degrees of freedom.

The vibration systems of one-degree of freedom have no resonance frequency, and the incident wave and the transmitted waver have always the same phase. On the other hand, the vibration systems of two-degrees of freedom formed in the extending portions have only one resonance frequency, and the incident wave and the transmitted wave have opposite phases to each other in a frequency not less than the resonance frequency.

Therefore, in a frequency band not less than the resonance frequency of the vibration system of two-degrees of freedom, the transmitted wave transmitting the continuous hole has an opposite phase to that of the transmitted wave transmitting the extending portions and the air chamber to cancel each other out so as to obtain noise insulating effects.

Thus, the noise insulating wall structure forms vibration systems of at least two types, each comprising air masses and an air spring, so that transmitted waves from the respective vibration systems interfere with each other to cancel each other out to obtain noise insulating effects.

In the aforementioned noise insulating wall structures, since the noise insulating plates have a plurality of through holes, it is possible to ensure permeability and to easily discharge heat in the engine room to the outside. Therefore, according to such a noise insulating wall structures, it is possible to provide an under cover which has both of permeability and noise restraining characteristic. In addition, in the latter noise insulating wall structure, since some of the extending portions have the opening for draining water, it is possible to prevent water from accumulating between the noise insulating plates while preventing the decrease of noise insulating performance.

When the aforementioned noise insulating wall structures are manufactured, a ratio of an open area of the cylindrical portions to an opening area for ventilation through the cylindrical portions and the through holes which are not communicated with the cylindrical portions (which will be hereinafter referred to as "straight-tube ratio $\beta$") is predetermined at its design phase. Then, it is confirmed whether the frequency characteristic of the actually manufactured noise insulating wall is adapted to the frequency suitable for insulating the noise. When it is not adapted thereto, the ratio of the open area of the cylindrical portion to that of the through holes which are not communicated with the cylindrical portions is varied to adjust the frequency characteristic so as to be adapted to the frequency suitable for insulating the noise.

When the noise insulating wall is molded by, for example, a resin mold, the frequency characteristic of the molded noise insulating wall is adjusted by reworking the molded portions corresponding to the cylindrical portions and the through holes which are not communicated with the cylindrical portions to vary the ratio of the open areas.

However, it is not easy to accurately form the opening portions of the cylindrical portions and the through holes which are not communicated with the cylindrical portions in order to obtain a desired frequency characteristic, and it is also not easy to adjust the frequency characteristic since the frequency characteristic after adjustment is greatly apart from the desired frequency characteristic or since the variation of the frequency characteristic after adjustment is too small.

In addition, since the adjustment of the frequency characteristic is not easy, it is not easy to delicately vary the frequency characteristic so as to be adapted to a noise of a frequency which is slightly different from the frequency suitable for insulating another noise.

Moreover, when the latter noise insulating wall structure is molded by, for example, a resin mold, an opening for draining water must be formed in the molded noise insulating wall, so that the manufacturing cost increases.

SUMMARY OF THE INVENTION

It is therefore an object of the present invention to provide a noise insulating wall structure which can easy adjust frequency characteristic to improve applicability and which can be inexpensively manufactured.

In order to accomplish the aforementioned and other objects, according to one aspect of the present invention, a noise insulating wall structure comprises: first and second noise insulating plates facing each other so as to be apart from another; a plurality of through holes formed in each of the first and second noise insulating plates, the plurality of through holes of the first noise insulating plate being so arranged as to face the corresponding through holes of the second noise insulating plate; a plurality of cylindrical portions for establishing communications between some of the through holes of the first noise insulating plate and the corresponding through holes of the second noise insulating plate, each of the plurality of cylindrical portions being divided into two half portions, one of which is integral with the first noise insulating plate and the other of which is integral with the second noise insulating plate; a plurality of abutting portions, each being arranged on an end face of each of the half portions of the cylindrical portions, the abutting portions of the half portions of the first noise insulating plate abutting the corresponding abutting portions of the half portions of the second noise insulating plate to connect the first noise insulating plate to the second noise insulating plate; and a plurality of notched portions, each establishing a communication between the inside and outside of the cylindrical portion.

In this noise insulating wall structure, the noise insulating plates are connected to each other to form the cylindrical portions by causing the abutting portions of one of the noise insulating walls to connect to the abutting portions of another noise insulating wall.

In addition, in this noise insulating wall structure, the communication between the inside and outside of the cylindrical portion is established by the notched portion formed in at least one of two abutting portions which abut each other. Therefore, the air layers at the central portion in the cylindrical portion and at the central portions in the through holes serve as air masses to form a vibration system of one-degree of freedom. In addition, the air layers outside of the air layers at the central portions in the through holes serve as air masses and the air layer outside of the air layer at the central portion in the cylindrical portion serves as an air spring to form a vibration system of two-degrees of freedom. Thus, the transmitted waves from the respective vibration systems interfere with each other to cancel each other out to insulate the noise transmitting through the noise insulating wall.

In this case, the ratio of the open area of the cylindrical portion to the opening area defined by the through hole and the cylindrical portion (straight-tube ratio $\beta$) is varied by varying the number, size and shape of the notched portions formed in the abutting portions. That is, since the influence of the air layer between the noise insulating plates upon the air layer in the cylindrical portion increases when the number or size of the notched portions is increased, the volumes of the cylindrical air layers serving as air masses at the central portions in the through holes and at the central portion in the cylindrical portion decrease, so that the open area decreases when it is assumed that the air masses at the central portions in the through holes and at the central portion in the cylindrical portion are cylindrical portions, whereby the straight-tube ratio $\beta$ decreases.

On the other hand, since the influence of the air layer between the noise insulating plates upon the air layer in the cylindrical portion decreases when the number or size of the notched portions is decreased, the volumes of the cylindrical air layers serving as air masses at the central portions in the through holes and at the central portion in the cylindrical portion decrease, so that the open area increases when it is assumed that the air masses at the central portions in the through holes and at the central portion in the cylindrical portion are cylindrical portions, whereby the straight-tube ratio $\beta$ increases.

Therefore, the straight-tube ratio $\beta$ of the noise insulating wall can be adjusted by adjusting the number, size and shape of the notched portions. Since the frequency characteristic of the noise insulating wall is delicately varied by varying the straight-tube ratio $\beta$, the frequency characteristic can be delicately adjusted by adjusting the number, size and shape of the notched portions, so that the frequency characteristic can be easily adjusted so as to be adapted to the frequency suitable for insulating the noise. Moreover, since the frequency characteristic can be easily adjusted so as to be adapted to the frequency suitable for insulating the noise, the applicability of the noise insulating wall structure can be improved.

In addition, when the noise insulating wall is molded by, for example, a resin mold, the number and size of the notched portions can be adjusted by working the mold portions corresponding to the notched portions. Therefore, no working is required after molding, and the manufacturing cost decreases.

The notched portions may be arranged at point-symmetrical positions on a cross section taken along radial directions of each of the cylindrical portions.

In this case, since the air layer at the central portion in the cylindrical portion in which the notched portions are formed serves as an air mass in a substantially straight-tubular cylindrical portion by arranging the notched portions at point-symmetrical positions on the cross section taken along radial directions of the cylindrical portion, the air mass moves along the axis of the cylindrical portion when the air mass vibrates in the cylindrical portion. Therefore, the adjustment of the obtained frequency characteristic can be stabilized.

All the through holes may be designed to communicate with any one of the half portions of the cylindrical portions.

In this case, the noise insulating plates can be firmly connected to each other, since all the through holes formed in the noise insulating plates communicate with the corresponding cylindrical portions between the noise insulating plates.

The frequency at which the maximum noise insulating performance can be obtained may be designed so as to be adapted to the frequency suitable for insulating the noise by adjusting the number of the notched portions.

In this case, it is possible to surely obtain noise insulating effects by increasing the number of the notched portions to cause the frequency at which the maximum noise insulating performance can be obtained to be adapted to the frequency suitable for insulating the noise.

Each of the notched portions may be designed to have a rectangular slit-like shape.

In this case, the ratio of the open area of the cylindrical portion to the open area of the through hole (straight-tube ratio) can be greatly varied by adjusting the number of the rectangular slit-like notched portions, and the frequency at which the maximum noise insulating performance can be obtained can be greatly varied.

Each of the notched portions may be designed to extend in the axial directions of the cylindrical portions.

In this case, water entering the space between the noise insulating plates is discharged to the outside through the elongated notched portions so formed as to extend in the axial direction of the cylindrical portion. Therefore, the notched portions can serve as drain holes.

The notched portions may be formed in the abutting portions of both of the half portions of each of the cylindrical portions so that the notched portions formed in one of the half portion face the notched portions formed in the other of the half portion when the abutting portions of the one half portion are connected to the abutting portions of the other half portion.

Each of the cylindrical portions may be divided at the center between the noise insulating plates so that the first and second noise insulating plates have the same shape.

In this case, noise insulating plates of a single type may be manufactured, and noise insulating plates of a plurality of types are not necessary to be manufactured. Therefore, the manufacturing cost can be decreased.

The first and second noise insulating walls may be designed to form a part of an under cover of an engine room of an automotive vehicle.

In this case, the noise insulating wall structure can serve as the under cover of the engine room of the automotive vehicle. Therefore, it is possible to insulate noises while maintaining the permeability.

Cylindrical portion may be divided into two half portions integral with each noise insulating plates and one intervening portion being interposed between said two half portions.

In this case, a distance between said first noise insulating plate and said second noise insulating plate is set by using one of various lengthes of intervening portions. Therefore it is possible to get easily frequency characteristic that should be insulated. Moreover it is possible to easily change the number of the cylindrical portions, therefore it is possible to easily change the straight-tube ratio according to necessary frequency characteristic.

Some of the intervening portion may have a plurality of opening formed at a side wall thereof.

In this case, it is possible to easily change the straight-tube ratio by preparing and using many intervening portions that have various type of opening.

Each of the half portion and the intervening portion may have an engaging portions that are fitted each other. In this case, it is possible to change the intervening portion easily and quickly.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiments, but are for explanation and understanding only.

In the drawings:

FIG. 6 is a graph showing the transmission loss with respect to the frequency of the noise insulating wall structure in the first preferred embodiment, which shows the measured values indicating the conditions when the straight-tube ratio $\beta$ is varied;

FIG. 15A shows a standard data for the calculated result of FIG. 5 and the experiment result of FIG. 6;

FIG. 15B is a cross sectional view taken along the line XVB—XVB in FIG. 15A;

FIG. 16 shows a measuring way for the experiment result of FIG. 6;

DESCRIPTION OF THE PREFERRED EMBODIMENT

[First Preferred Embodiment]

Figure 1:
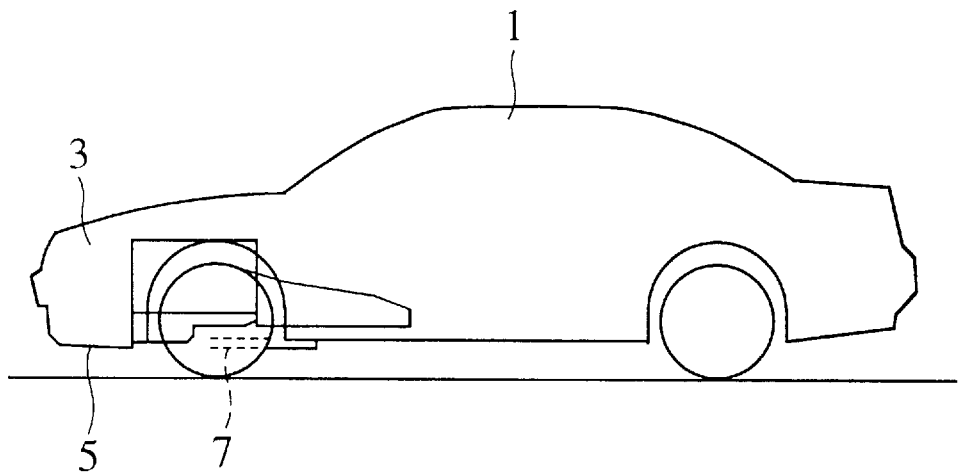
FIG. 1 is a schematic side view of an automotive vehicle having an under cover.

Referring now to the drawing, particularly to FIGS. 1 through 6, the first preferred embodiment of a noise insulating wall structure according to the present invention will be described below.

Figure 2:
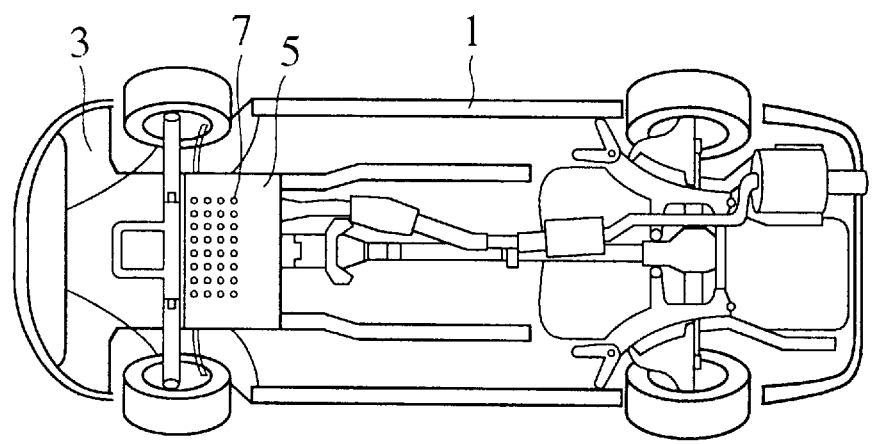
FIG. 2 is a bottom view of the automotive vehicle of FIG. 1.

FIGS. 1 and 2 show an automotive vehicle 1 to which a noise insulating wall structure according to the present invention is applied. On the lower portion of an engine room 3 of the automotive vehicle 1, an under cover 5 is mounted. The under cover 5 is designed to improve aerodynamic characteristics at the lower portion of the engine room 3 and to protect components in the engine room 3 from rocks and so forth.

Figure 3A:
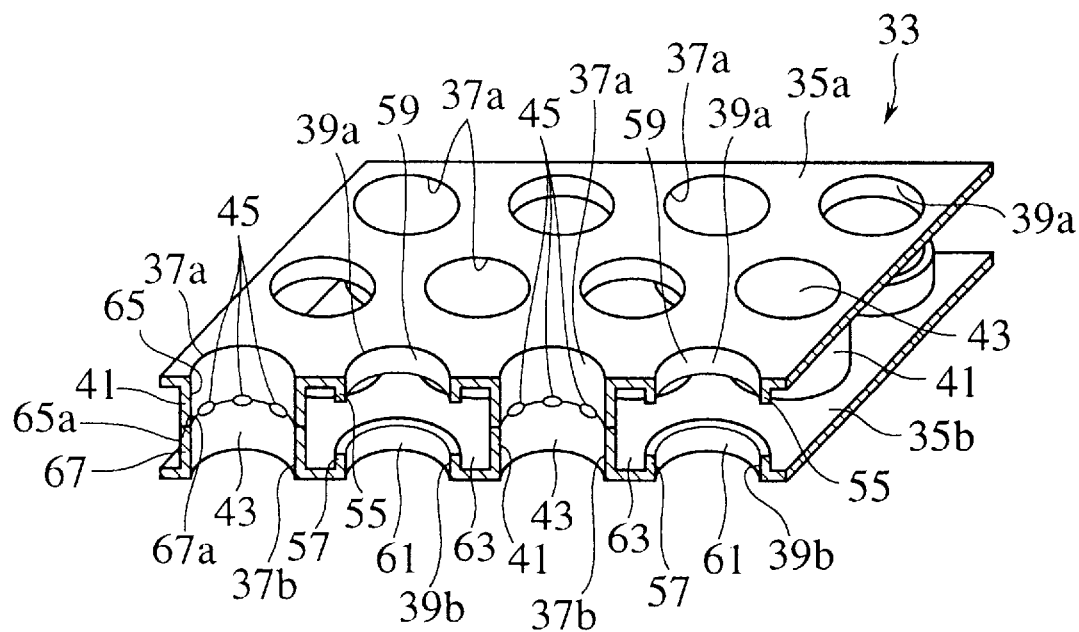
FIG. 3A is a perspective view of the first preferred embodiment of a noise insulating wall structure according to the present invention.
Figure 3B:
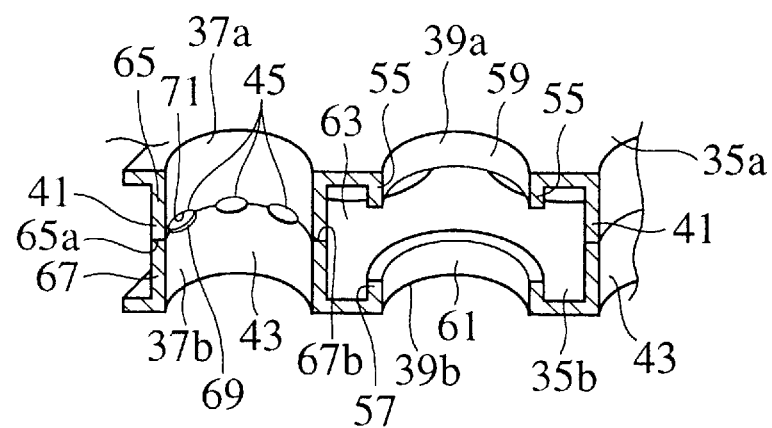
FIG. 3B is an enlarged perspective view of a cylindrical portion of the noise insulating wall structure of FIG. 3A.
Figure 4A:
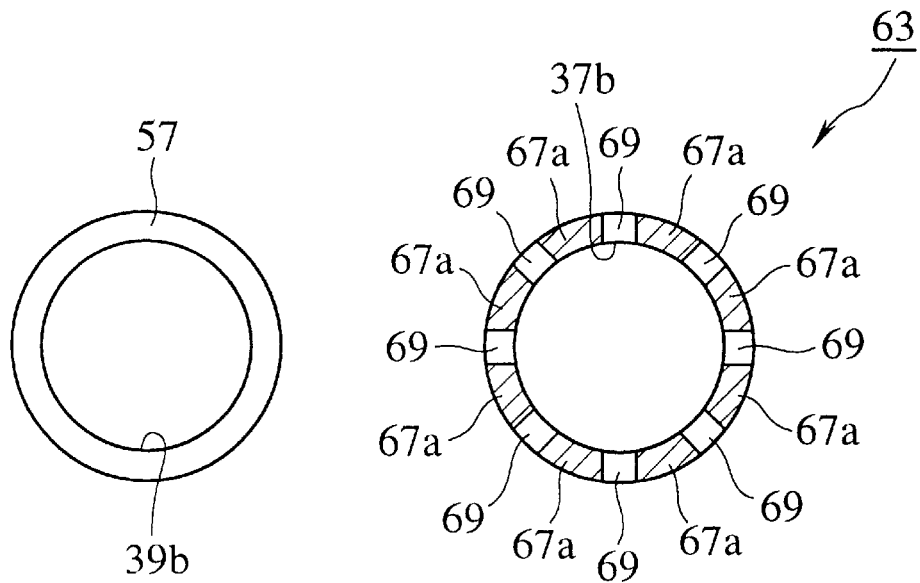
FIG. 4A is a sectional view of the noise insulating wall structure in the first preferred embodiment, which is taken along line IVA—IVA of FIG. 4B.
Figure 4B:
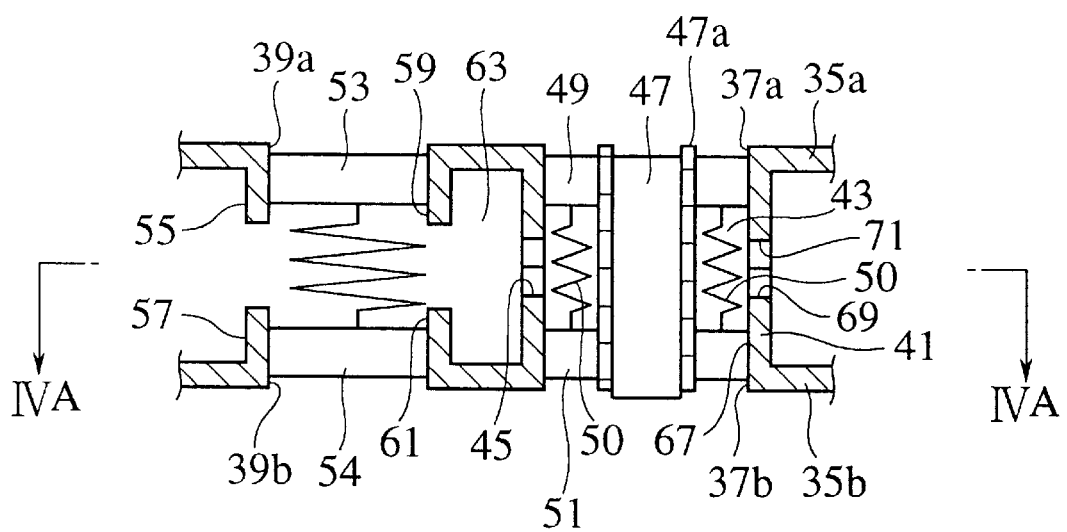
FIG. 4B is a sectional view of the noise insulating wall structure in the first preferred embodiment, which illustrates behavior of air layers in the cylindrical portion.

FIGS. 3A and 3B show a noise insulating wall 33 in the first preferred embodiment of a noise insulating wall structure according to the present invention. The noise insulating wall 33 is applied to the under cover 5 of the automotive vehicle 1 as shown in FIGS. 1 and 2. The under cover 5 is integrally formed with the noise insulating wall 33 on the rear side thereof. In addition, FIG. 4B is a cross section showing the mechanism of the noise insulating wall 33, and FIG. 4A is a cross section taken along line a—a of FIG. 4B.

As shown in FIG. 3A, the noise insulating wall 33 comprises a pair of noise insulating plates 35a and 35b which are opposed so as to be apart from each other by an interval. The noise insulating plate 35a has a plurality of through holes 37a and 39a, and the noise insulating plate 35b has a plurality of through holes 37b and 39b. The noise insulating wall 33 also has a plurality of cylindrical portions 41 for connecting the noise insulating plates 35a and 35 to each other and for communicating some of the through holes 37a with the corresponding through holes 37b between the noise insulating plates 35a and 35b.

From the open edges of the through openings 39a and 39b which are not communicated with the cylindrical portions 41, cylindrical extending portions 55 and 57 project to the space between the noise insulating plates 35a and 36b, each of the cylindrical extending portions 55 and 57 having substantially the same inner diameter as those of the through holes 39a and 39b so as to form extending through holes 59 and 61 facing each other. An air chamber 63 is defined around the extending portions 55 and 57 between the noise insulating plates 35a and 35b. Air layers 53 and 54 within the extending through holes 59 and 61 serve as air masses, and the air layer 63 within the air chamber 63 serves as an air spring, so as to form a vibration system of two-degrees of freedom.

In the noise insulating plate 33 of this preferred embodiment, each of the cylindrical portions 41 is divided at the center between the noise insulating plates 35a and 35b. The divided cylindrical portions 41 are provided with abutting portions 65a and 67a. The abutting portions 65a and 67a has notched portions 71 and 69, respectively. Each of the notched portions 71 is associated with the corresponding notched portion 69 to form a communication hole 45 for establishing the communication between the inside and outside of the cylindrical portion 41 when the noise insulating plates 35a and 35b are connected to each other. The noise insulating plates 35a and 35b having the same shape can be connected to each other by connecting the abutting portions 65a to the corresponding abutting portions 67a.

As shown in FIG. 3B, the abutting portions 65a and 67a are formed on the end faces of the wall portions 65 and 67 which project from the open edges of the through holes 37a and 37b to the space between the noise insulating plates 35a and 35b. The notched portions 71 and 69 are formed by cutting away arc portions from the end faces of the abutting portions 65a and 67a. As shown in FIG. 4A, these notched portions 71 and 69 are arranged at the point-symmetrical positions on the cross section taken along the radial directions of the cylindrical portion 41 (however, only notched portions 69 are shown in the figure). When the abutting portions 65a and 67b abut each other, each of the notched portions 71 is associated with the corresponding notched portion 69 to form a substantially circular communication hole 45 for establishing the communication between the inside and outside of the cylindrical portion 41.

As shown in FIG. 4A, when noise enters the interior of the cylindrical portion 41, a cylindrical air layer 47 at the central portion in a continuous hole 43 serves as an air mass to form a vibration system of one-degree of freedom. Among the annular air layers surrounding the vibration system of one-degree of freedom, air layers 49 and 51 in the through holes 37a and 37b serve as air masses, and an annular air layer surrounding the air layers 47 between the through holes 37a and 37b serves as an air springs 50, so as to form a vibration system of two-degrees of freedom.

That is, since the interior of the cylindrical portion 41 communicates with the space between the noise insulating plates 35a and 36b through the communication holes 45 comprising the notched portions 69 and 71 formed in the abutting portions 65a and 67a, the interior of the cylindrical portion 41 is not completely acoustically separated from the air chamber 63 between the noise insulating plates 35a and 35b. Therefore, the air layer within the cylindrical portion 41 is under the influence of the air layers between the noise insulating plates 35a and 35b through the notched portions 69 and 71. As a result, the air layers 49 and 51 on the inner wall side of the through holes 37a and 37b communicated with each other by the cylindrical portion 41 serve as air masses, and the air layer on the inner wall side of the cylindrical portion 41 serves as an air spring 50, so as to form a vibration system of two-degrees of freedom.

Since the influence of the air layer between the noise insulating plates 35a and 35b upon the air layer 47 which comprises the air layers at the central portions of the cylindrical portion 41 and the through holes 37a and 37b, is relatively small, the air layer 47 serves as a cylindrical air mass to form a vibration system of one-degree of freedom as shown in FIG. 4A.

The relationship between the influence upon the air layer within the cylindrical portion 41 and the number of the notched portions 69 and 71 will be described. As the number of the notched portions 69 and 71 increases, the air layer within the cylindrical portion 41 is under the great influence of the air layer between the noise insulating plates 35a and 35b. As the number of the notched portions 69 and 71 increases, the volumes of the air layers 49 and 51 serving as the air masses of a vibration system of two-degrees of freedom at the outside portion in the through holes 37a and 37b increase, and the volume of the air layer serving as the air spring of the vibration system at the outside portion in the cylindrical portion 41 also increases, so as to increase the function as a vibration system of two-degrees of freedom. In addition, since the volume of the air layer 47 serving as an air mass of a vibration system of one-degree of freedom at the central portions of the through holes 37a and 37b and the cylindrical portion 41 decreases, the function serving as the vibration system of one-degree of freedom decreases.

On the other hand, when the number of the notched portions 69 and 71 is small, the influence of the air layer between the noise insulating plates 35a and 35b upon the air layer in the cylindrical portion 41 through the notched portions 69 and 71 is small. Therefore, the volumes of the air layers 49 and 51 serving as the air masses of the vibration system of two-degrees of freedom at the outside portions in the through holes 37a and 37b decrease, and the volume of the air layer serving as the air spring of the vibration system at the outside portion in the cylindrical portion 41 decreases, so that the function as the vibration system of two-degrees of freedom increases. In addition, since the volume of the air layer 47 serving as the air mass of the vibration system of one-degree of freedom at the central portions of the through holes 37a and 37b and the cylindrical portion 41 increases, the function as the vibration system of one-degree of freedom increases.

In addition, the volume of the air layer 47 at the central portion of the cylindrical portion 41 varies in accordance with the variation of the number of the notched portion 69 and 71, to vary the open area of the cylindrical portion 47a when it is assumed that the air layer 47 at the central portion of the cylindrical portion 41 is surrounded by the air layers 49 and 51, so that the straight-tube ratio (the ratio of the open area of the cylindrical portion 47a to the opening area defined by the through holes 39a and 39b and the cylindrical portion 47a) β varies. When the number of the notched portions 69 and 71 increases, the straight-tube ratio β decreases, and when the number of the notched portions 69 and 71 decreases, the straight-tube ratio β increases.

Therefore, it is possible to change the straight-tube ratio β of the noise insulating wall 33 by adjusting the numbers of the notched portions 69 and 71.

Figure 5:
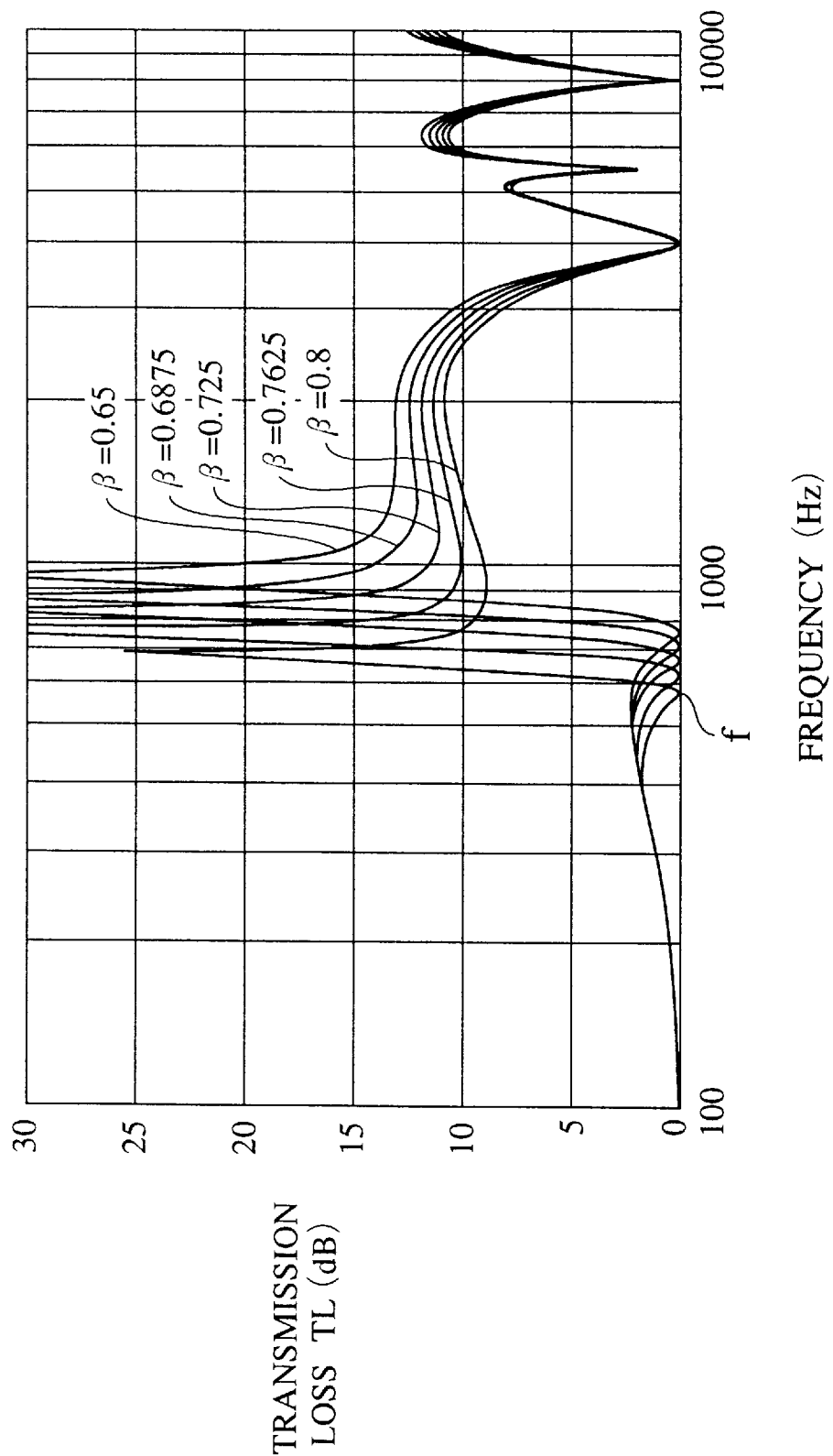
FIG. 5 is a graph showing the transmission loss with respect to the frequency of the noise insulating wall structure in the first preferred embodiment, which shows the calculated values indicating the conditions when the straight-tube ratio $\beta$ is varied.

FIG. 5 shows the calculated values in the variation of the frequency characteristic with respect to various straight-tube ratios β. As shown in FIG. 5, when the straight-tube ratio β varies from 0.65 to 0.8, the resonance frequency f slightly varies, and when the straight-tube ratio β decreases, the resonance frequency f increases. It can be seen from this figure that when the straight-tube ratio β varies, the frequency characteristic slightly varies. Furthermore, in FIG. 5, the increase of transmission loss TL (dB) at a frequency means the increase of the noise insulating effect at that frequency.

Therefore, the straight-tube ratio β can be varied by adjusting the number of the notched portions 69 and 71, and the frequency characteristic of the noise insulating wall 33 can be delicately varied by varying the straight-tube ratio β.

FIG. 6 shows the results in the experiment for deriving the frequency characteristics when changing the number of the notched portions 69 and 71 of the noise insulating wall 33 in this preferred embodiment. It can be seen from FIG. 6 that when the number of the notched portions 69 and 71 varies, the frequency characteristic of the noise insulating wall 33 slightly varies. That is, when the number of the communication hole 45 comprising the notched portions 69 and 71 is increased from 0 to 16, the straight-tube ratio β decreases and the resonance frequency increases from f0 to f16, so that the obtained frequency characteristic slightly varies.

In addition, in the noise insulating wall 33 in this preferred embodiment, the frequency at which the maximum noise insulating performance can be obtained (the frequency f0P to f16P when the transmission loss TL is the maximum value in FIG. 6) is slightly changed by increasing the number of the notched portions 69 and 71, to adjust the frequency so as to be adapted to the frequency suitable for insulating the noise.

The operation of the noise insulating wall 33 will be described below.

The noise emitted from a noise emitting source such as an oil pan in the engine room passes through the through holes 37a, 37b, 39a and 39b and the cylindrical portion 41 to be radiated to the outside of the vehicle. The noise passing through the through holes 39a and 39b and the air chamber 63 is transmitted through the noise insulating wall 33 via the vibration system of two-degrees of freedom to be radiated to the outside of the vehicle. The noise passing through the through holes 37a and 37b and the cylindrical portion 41 is transmitted via the vibration system of one-degree of freedom at the central portion of the cylindrical portion 41, and it is transmitted via the vibration system of two-degrees of freedom at the surrounding portion thereof.

Since the transmitted wave from the vibration system of two-degrees of freedom has the characteristic that the phase is inverted at a frequency band not less than its resonance frequency, it has an opposite phase to that of the transmitted wave from the vibration system of one-degree of freedom so as to cancel each other out to obtain the noise insulating effect.

In addition, in the noise insulating wall 33 in this preferred embodiment, the frequency characteristic is delicately adjusted by Increasing the number of the notched portions 69 and 71 to decrease the straight-tube ratio β, so as to cause the frequency at which the maximum noise insulating performance can be obtained, i.e. the frequency at the maximum value of transmission loss TL (dB), to be adapted to the frequency suitable for insulating the noise, thereby accurately obtaining the predicted noise insulating performance.

That is, as shown in FIG. 6, when the number of the communication holes 45 comprising the notched portions 69 and 71 is increased from 0 to 16, the resonance frequency increases from f0 to f16 and the frequency having the maximum transmission loss (dB) increases from f0P to f16P. Therefore, the number of the notched portions 69 and 71 is so adjusted as to cause the frequency at which the maximum noise insulating effect can be obtained, i.e. at which the transmission loss TL (dB) is maximum, to be adapted to the frequency suitable for insulating the noise, so that it is possible to effectively insulate the noise.

According to the noise insulating wall 33 in this preferred embodiment, it is possible to easily adjust the obtained frequency characteristic by adjusting the number of the notched portions 69 and 71, and it is possible to vary the straight-tube ratio β by adjusting the number of the notched portions 69 and 71, so that the frequency characteristic can be delicately adjusted.

In addition, when it is desired that the obtained frequency characteristic is delicately changed without changing the open areas of the through holes 37a, 37b, 39a and 39b and the cylindrical portion 41 which are set at the design phase, it is possible to easily change the frequency characteristic by increasing the number of the notched portions 69 and 71. Therefore, since it is possible to delicately change the frequency characteristic so as to be adapted to another noise to be insulated which has a slightly different frequency, the noise insulating 33 wall in this preferred embodiment is widely applicable.

In addition, in the noise insulating wall 33 in this preferred embodiment, it is possible to easily adjust the frequency characteristic so as to be applied to the frequency suitable for insulating noise by adjusting the number of the notched portions 69 and 71 and it is possible to easily adjust the frequency at which the maximum noise insulating performance can be obtained so as to be adapted to the frequency suitable for insulating the noise, so that it is possible to surely obtain noise insulating effects.

In addition, in the noise insulating wall 33 in this preferred embodiment, since the notched portions 69 and 71 are arranged at the point-symmetrical positions on the cross section taken along the radial directions of the cylindrical portion 41, the air layer 47 formed at the central portion of the cylindrical portion 41 is easy to become a cylindrical such as an air mass in the substantially straight-tubular cylindrical portion. As a result, since the air layer 47 at the central portion of the cylindrical portion 41 moves in the axial direction when it vibrates upwards and downwards in the cylindrical portion 41, the adjustment of the obtained frequency characteristic can be stabilized.

When the noise insulating wall 33 in this preferred embodiment is molded by, for example, a resin mold or the like, the straight-tube ratio β can be easily varied by slightly processing the molds corresponding to the abutting portions 65a and 67a, and the fine adjustment of the frequency characteristic can be easily performed. Therefore, since new processing is not required after molding, the noise insulating wall can be inexpensively manufactured.

In addition, in the noise insulating wall 33 in this preferred embodiment, the cylindrical portion 41 is divided into two portions at the central position between the noise insulating plates 35a and 35b. That is, the noise insulating wall 33 is formed by connecting the noise insulating plates 35a and 35b of the same shape to each other. Therefore, noise insulating plates of only one type may be manufactured, and it is unnecessary to manufacture noise insulating plates of a plurality of types, so that the manufacturing cost can be decreased. Moreover, when the noise insulating wall 33 is molded by a resin mold, the molding can be performed by only one mold, so that the manufacturing cost can be decreased.

According to this preferred embodiment, since the through holes 37a, 37b, 39a and 39b and the cylindrical portion 41 are formed in the under cover 5, it is possible to assure the permeability and to easily discharge heat from the engine room to the outside. In addition thereto, the noise insulating wall 33 serves as a part of the under cover 5, so that it is possible to protect the components in the engine room from rocks and so forth and to improve the aerodynamic characteristics of the automotive vehicle.

Furthermore, in this preferred embodiment, while the communication hole 45 for establishing the communication between the inside and outside of the cylindrical portion 41 has been formed by forming the notched portions 69 and 71 in the abutting portions 65a and 67a, any one of the notched portions 69 and 71 may be formed in any one of the abutting portions 65a and 67a. Moreover, in this preferred embodiment, while the notched portions 69 and 71 have been provided at the corresponding positions of the abutting portions 65a and 67a and while the communication hole 45 has been formed by causing the notched portions 69 and 71 to face each other when the noise insulating plates 35a and 35b are connected to each other, the positions of the notched portions 69 and 71 may be shifted in the circumferential direction of the cylindrical portion 41.

In addition, in this preferred embodiment, while the frequency characteristic has been adjusted by adjusting the numbers of the notched portions 69 and 71 to vary the straight-tube ratio β, the frequency characteristic may be delicately adjusted by adjusting the sizes of the notched portions 69 and 71 to vary the straight-tube ratio β, since the air layer between the noise insulating plates 35a and 35b has an influence upon the air layer in the cylindrical portion 41 through the notched portions 69 and 71.

That is, when the sizes of the notched portions 69 and 71 are increased to increase the influence of the air layer between the noise insulating plates 35a and 35b upon the air layer in the cylindrical portion 41, it is possible to decrease the function as a vibration system of one-degree of freedom in the cylindrical portion 41 and to increase the function as a vibration system of two-degrees of freedom therein, so that the straight-tube ratio β can be decreased. On the other hand, when the sizes of the notched portions 69 and 71 are decreased to increase the influence of the air layer between the noise insulating plates 35a and 35b upon the air layer in the cylindrical portion 41, it is possible to increase the function as a vibration system of one-degree of freedom in the cylindrical portion 41 and to decrease the function as a vibration system of two-degrees of freedom therein, so that the straight-tube ratio β can be increased. Therefore, it is possible to vary the straight-tube ratio β by varying the sizes of the notched portions 69 and 71, so that the frequency characteristic of the noise insulating wall can be delicately adjusted.

[Second Preferred Embodiment]

Figure 7A:
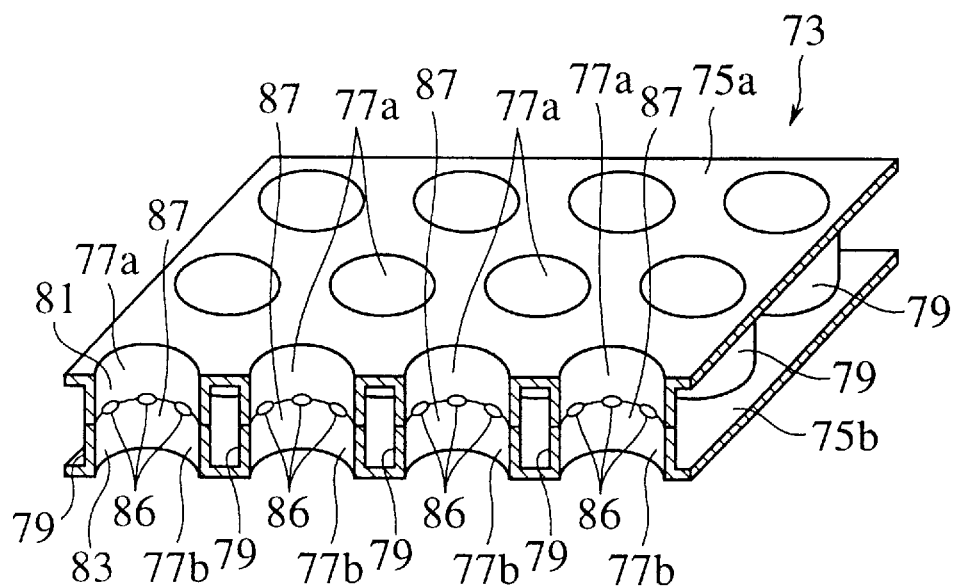
FIG. 7A is a perspective view of the second preferred embodiment of a noise insulating wall structure according to the present invention.
Figure 7B:
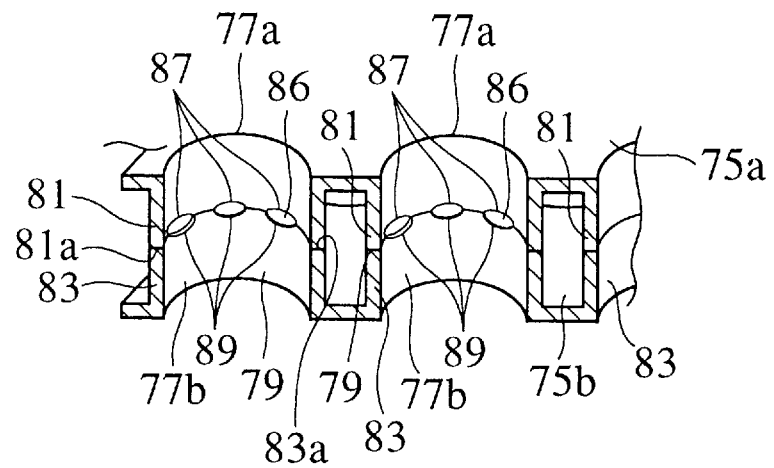
FIG. 7B is an enlarged perspective view of a cylindrical portion of the noise insulating wall structure of FIG. 7A.

Referring to FIGS. 7A and 7B, the second preferred embodiment of a noise insulating wall structure according to the present invention will be described below.

As shown in FIG. 7A, a noise insulating wall 73 in this preferred embodiment comprises a pair of noise insulating plates 75a and 75b. The noise insulating plates 75a and 75b has a plurality of through holes 77a and 77b, respectively. Each of the through holes 77a is communicated with the corresponding one of the through holes 77b via a cylindrical portion 79.

Similar to the first preferred embodiment, in the noise insulating wall 73 in this preferred embodiment, each of the cylindrical portions 79 is divided at the central portion to form abutting portions 81a and 83a. In the abutting portions 81a and 83a, notched portions 87 and 89 for establishing the communication between the inside and outside of the cylindrical portion 79 are formed, respectively. When the abutting portions 81a and 83a are connected to each other, the noise insulating plates 75a and 75b are connected to each other.

The abutting portions 81a and 83a are formed in the end faces of wall portions 81 and 83, respectively, which project from the open edges of the through holes 77a and 77b to the space between the noise insulating plates 75a and 75b, respectively. The notched portions 87 and 89 are formed by cutting away arc portions from the end faces of the abutting portions 81a and 83a, respectively. These notched portions 87 and 89 are arranged at the point-symmetrical positions on the cross section taken along the radial directions of the cylindrical portion 79. When the abutting portions 81a and 83b abut each other to be connected to each other, the notched portions 81 and 89 are associated with each other to form a substantially circular communication hole 45 for establishing the communication between the inside and outside of the cylindrical portions 79.

Similar to the aforementioned first preferred embodiment, the air layer at the central portion in the cylindrical portion 79 serves as an air mass to form a vibration system of one-degree of freedom. In addition, the air layers in the through holes 77a and 77b of the annular air layer surrounding the air layer at the central portion in the cylindrical portion serve as air masses, and the annular air layer surrounding the air layer at the central portion in the cylindrical portion 79 between the through holes 77a and 77b serves as an air spring, so that a vibration system of two-degrees of freedom is formed. The ratio of the vibration system of one-degree of freedom to that of two-degree of freedom which are formed in the cylindrical portion 79 (allotted ratio) depends upon the number of the communication holes 86. If the number of the communication holes 86 is adjusted, the straight-tube ratio β varies, so that the frequency characteristic of the noise insulating wall 73 can be delicately varied.

In this preferred embodiment, the noise emitted from a noise emitting source such as an oil pan in the engine room passes through the through holes 77a and 77b and the cylindrical portion 79 to be radiated to the outside. The noise passing through the through holes 77a and 77b and the cylindrical portion 79 is transmitted through the vibration system of one-degree of freedom at the central portion of the cylindrical portion 79 and through the vibration system of two-degrees of freedom at the surrounding portion thereof. Since the transmitted wave from the vibration system of two-degrees of freedom has the characteristic that the phase is inverted at a frequency band not less than the resonance frequency, it has an opposite phase to that of the transmitted wave from the vibration system of one-degree of freedom to cancel each other out to obtain noise insulating effects.

In this preferred embodiment, the frequency characteristic can be adjusted by increasing the number of the notched portions 87 and 89 formed in the abutting portions 81a and 83a to vary the straight-tube ratio β, so that the frequency at which the maximum noise insulating performance can be obtained, i.e. the frequency having a transmission loss TL (dB) of the maximum value, can be adapted to the frequency suitable for insulating the noise.

According to this preferred embodiment, in addition to the same effects as those of the aforementioned first preferred embodiment, it is possible to firmly connect the noise insulating plates 75a and 75b to each other, since all the through holes 77a and 77b are connected to the corresponding through holes via the cylindrical portions 79 to increase the number of the abutment connections.

In addition, according to this preferred embodiment, since the portions in which water may enter between the noise insulating plates 75a and 75b are only the notched portions 87 and 89, the amount of the entering water is smaller than that when all the through holes 77a and 77b are not connected via the cylindrical portion 79.

Similar to the first preferred embodiment, in this preferred embodiment, it is possible to adjust the straight-tube ratio β by increasing or decreasing the sizes of the notched portions 87 and 89, and it is possible to delicately adjust the frequency characteristic.

Furthermore, while the notched portions 87 and 89 have been provided in the abutting portions 81a and 83a of all the cylindrical portions 79 in this preferred embodiment, the notched portions 87 and 89 may be provided in the abutting portions 81a and 83 of some of the cylindrical portions 79.

In addition, in this preferred embodiment, it is possible to adjust the number of the notched portions 87 and 89 by adjusting the number of the cylindrical portions 79, in addition to the adjustment of the number of the notched portions 87 and 89 provided in the cylindrical portions 79.

[Third Preferred Embodiment]

Figure 8A:
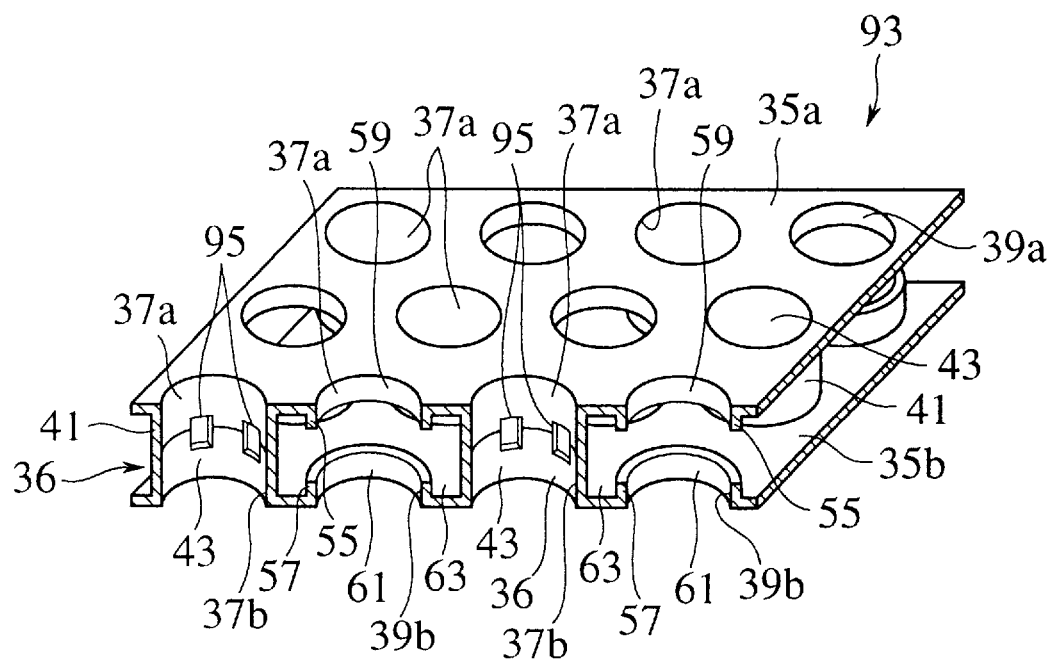
FIG. 8A is a perspective view of the third preferred embodiment of a noise insulating wall structure according to the present invention.
Figure 8B:
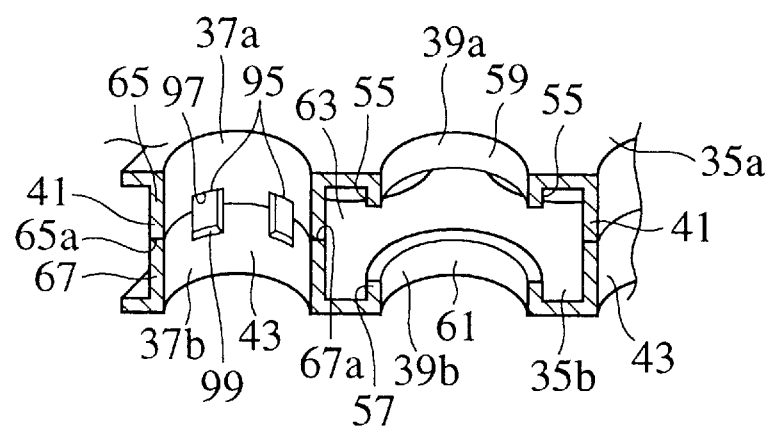
FIG. 8B is an enlarged perspective view of a cylindrical portion of the noise insulating wall structure of FIG. 8A.

Referring to FIGS. 8A and 8B, the third preferred embodiment of a noise insulating wall structure according to the present invention will be described below.

As shown in FIG. 8A, in a noise insulating wall 93 in this preferred embodiment, the shapes of notched portions 97 and 99 provided in a cylindrical portion 41 are different from those of the noise insulating wall 33 in the first preferred embodiment. The same reference numbers will be used for the portions of the same constructions as those in the first preferred embodiment, and the repeated descriptions will be omitted.

As shown in FIG. 8B, the noise insulating wall 93 has rectangular notched portions 97 and 99 in the abutting portions 65a and 67a. That is, rectangular portions are cut out of the end faces of the wall portions 65 and 67 forming the cylindrical portion 41 to form the notched portions 97 and 99. When the noise insulating plates 35a and 35b are connected to each other, the notched portions 97 and 99 are associated with each other to form a rectangular communication hole 95 for allowing the interior of the cylindrical portion 41 to communicate with the space between the noise insulating plates 35a and 35b.

Similar to the first preferred embodiment, the air layer at the central portion in the cylindrical portion 41 is under of the influence of the air layer between the noise insulating plates 35a and 35b through the rectangular notched portions 97 and 99, to serve as an air mass to form a vibration system of one-degree of freedom. Among the annular air layers surrounding the air layer at the central portion in the cylindrical portion 41, the air layers in the through holes 37a and 37b serve as air masses, and the air layer between the through holes 37a and 37b serves as an air spring to form a vibration system of two-degrees of freedom.

Figure 9:
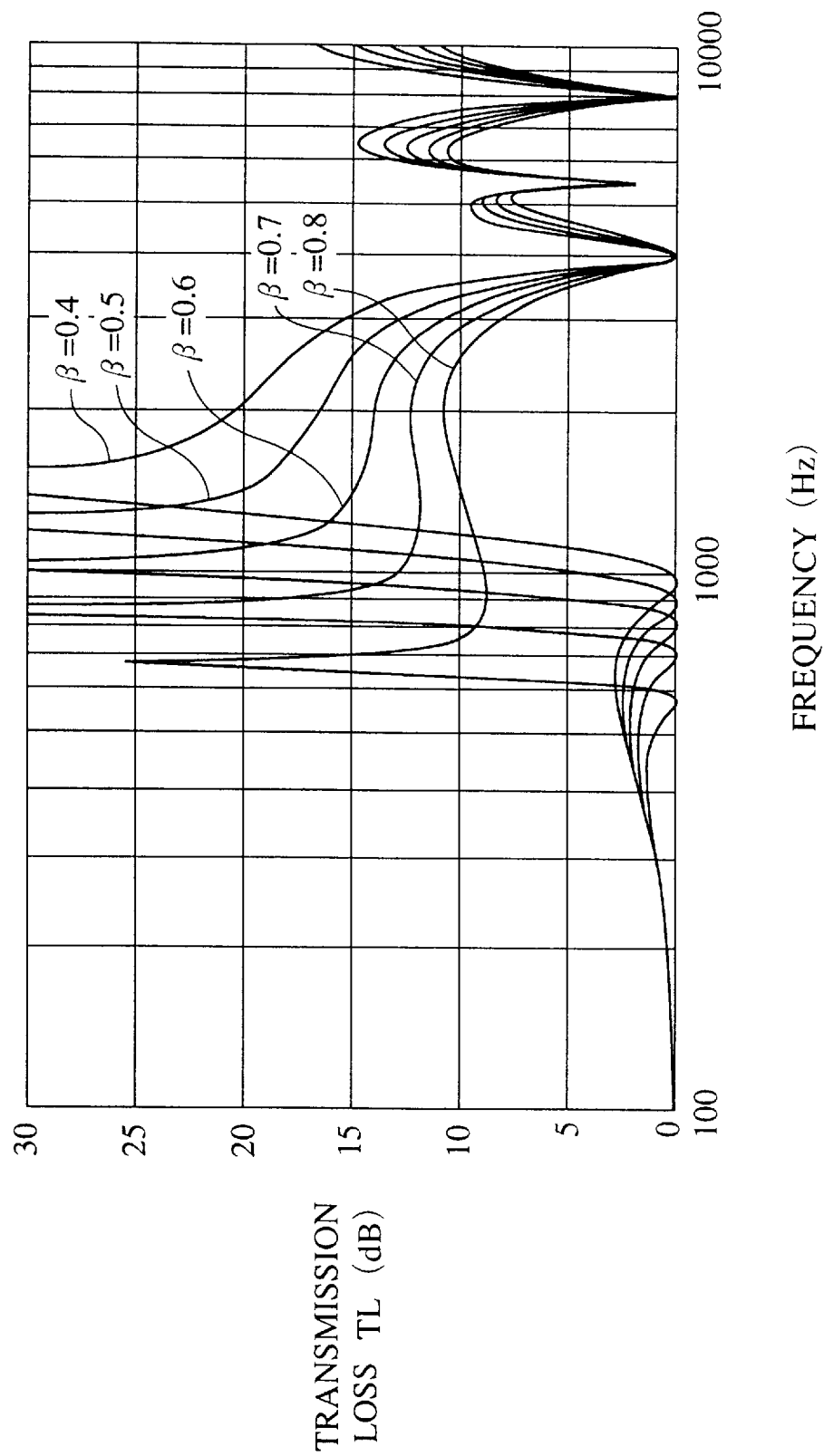
FIG. 9 is a graph showing the calculated values of transmission loss with respect to the frequency of the noise insulating wall structure in the third preferred embodiment.

Similar to the first and second preferred embodiments, in this preferred embodiment, as the number of the rectangular notched portions 97 and 99 increases, the straight-tube ratio β decreases, and as the number of the notched portions 97 and 99 decreases, the straight-tube ratio β increases. As shown in FIG. 9, the straight-tube ratio β can be greatly varied by varying the number of the rectangular notched portions 97 and 99. In addition, it is possible to vary the frequency at which the maximum noise insulating performance can be obtained so as to be adapted to the frequency suitable for insulating the noise by adjusting the number of the rectangular notched portions 97 and 99.

Similar to the first and second preferred embodiments, in this preferred embodiment, the noise emitted from a noise emitting source such as an oil pan in the engine room can transmit the vibration systems of one-degree and two-degrees of freedom, to cancel each other out to obtain noise insulating effects.

In addition to the same effects as those in the first and second preferred embodiments, the value of the straight-tube ratio β can be greatly varied by increasing the number of the rectangular notched portions 97 and 99. Therefore, since the frequency characteristic can be greatly varied in comparison with the first and second preferred embodiment, the frequency at which the maximum noise insulating performance can be obtained can be surely adapted to the frequency suitable for insulating the noise, so that it is possible to surely insulate the noise.

In addition, the straight-tube ratio β can be greatly varied to greatly vary the frequency characteristic by increasing the size of the notched portions 97 and 99.

[Fourth Preferred Embodiment]

Figure 10A:
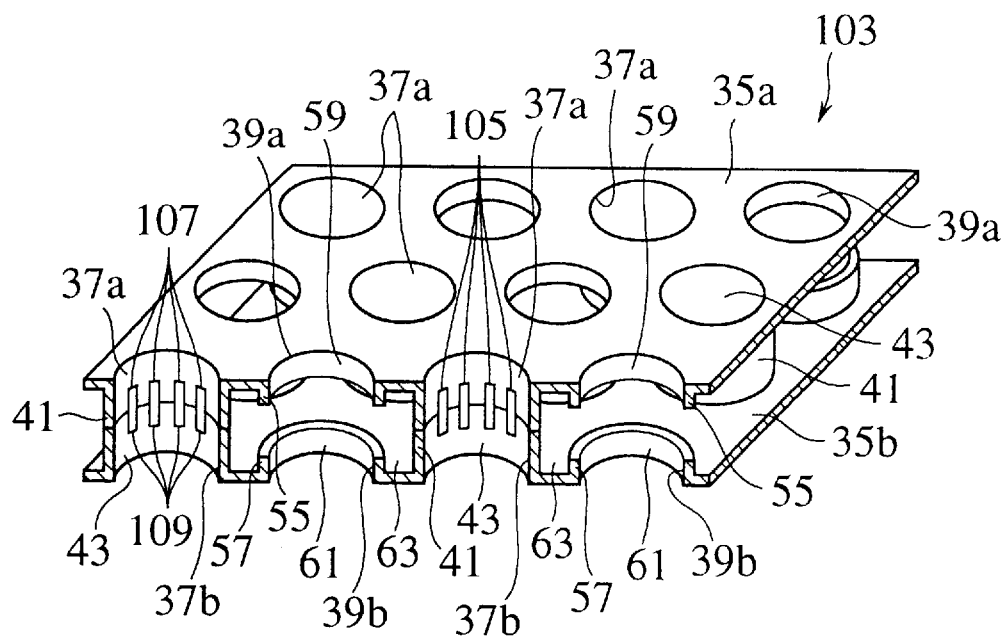
FIG. 10A is a perspective view of the fourth preferred embodiment of a noise insulating wall structure according to the present invention.
Figure 10B:
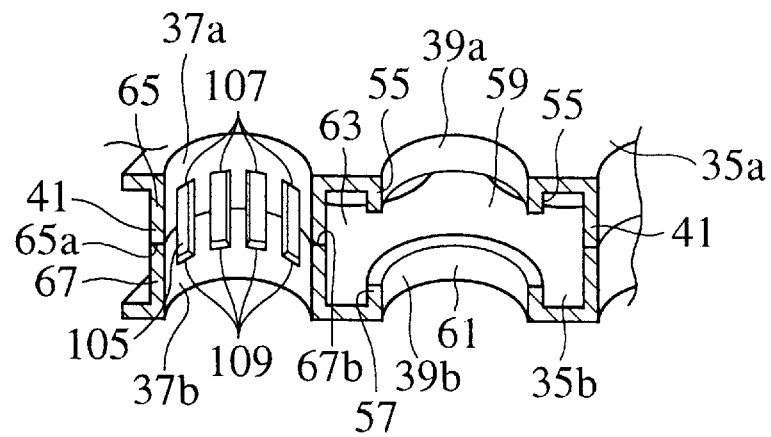
FIG. 10B is an enlarged perspective view of a cylindrical portion of the noise insulating wall structure of FIG. 10A.

Referring to FIGS. 10A and 10B, the fourth preferred embodiment of a noise insulating wall structure according to the present invention will be described below.

As shown in FIG. 10A, in a noise insulating wall 103 in this preferred embodiment, the shapes of notched portions 107 and 109 provided in a cylindrical portion 41 are different from those of the noise insulating wall 33 in the first preferred embodiment. The same reference numbers will be used for the portions of the same constructions as those in the first preferred embodiment, and the repeated descriptions will be omitted.

As shown in FIG. 10B, the noise insulating wall 93 has rectangular notched portions 107 and 109 in abutting portions 65a and 67a, respectively. Each of these notched portions 107 and 109 has an elongated slit-like shape extending in the axial direction of the cylindrical portion 41. When the noise insulating plates 35a and 35b are connected to each other, the notched portions 107 and 109 are associated with each other to form an elongated rectangular communication hole 105 for allowing the interior of the cylindrical portion 41 to communicate with the space between the noise insulating plates 35a and 35b.

Similar to the first preferred embodiment, in this preferred embodiment, the noise emitted from a noise emitting source such as an oil pan in the engine room can transmit the vibration systems of one-degree and two-degrees of freedom, to cancel each other out to obtain noise insulating effects.

In addition to the same effects as those in the first and third preferred embodiments, water entering the space between the noise insulating plates 35a and 35b can be discharged to the outside via the communication holes 105 formed by the notched portions 107 and 109, since the notched portions 107 and 109 have elongated slit-like shapes extending in the axis of the cylindrical portion 41. Therefore, the rectangular notched portions 107 and 109 in the noise insulating wall structure in this preferred embodiment can also be associated with each other to serve as a drain hole to prevent the decrease of noise insulating performance.

In addition, since the noise insulating wall 103 in this preferred embodiment has the communication holes serving as drain holes, it is unnecessary to provide additional drain holes, so that the noise insulating wall can be inexpensively manufactured.

[Fifth Preferred Embodiment]

Figure 11A:
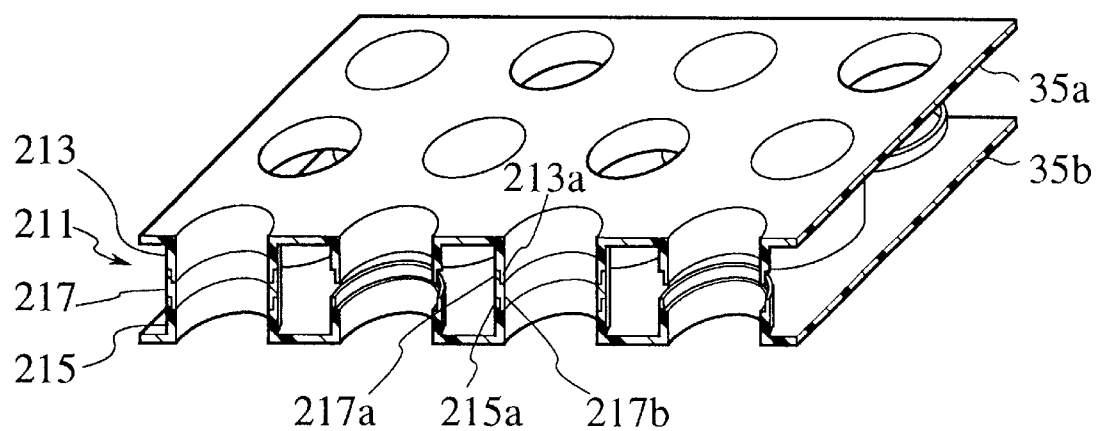
FIG. 11A is a perspective view of the fifth preferred embodiment of a noise insulating wall structure according to the present invention.
Figure 11B:
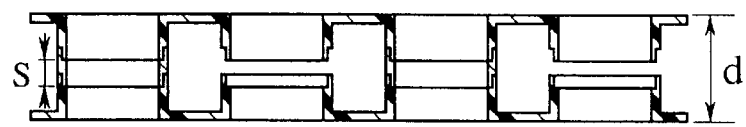
FIG. 11B is a sectional view of the noise insulating wall structure of FIG. 11A.

Referring to FIG. 11A and 11B, the fifth preferred embodiment of a noise insulating wall structure according to the present invention will be described bellow.

As shown in FIG. 11A and 11B, cylindrical portion 211 is divided into two half portions 213 and 215, and one intervening portion 217. One half portion 213 is integral with the first noise insulating plate 35a. The other half portion 215 is integral with the second noise insulating plate 35b. The intervening portion 217 is interposed between said two half portions 213 and 215. Each of the half portion 213 and 215 has an engaging portion 213a and 215a being arranged on an end face thereof. The intervening portion 217 has two engaging portions 217a and 217b being arranged on both ends face thereof. These engaging portions 213a, 215a, 217a and 217b are shaped such a way that the engaging portion 213a, 215a are able to be fitted to the engaging portion 217a, 217b. The engaging portion 213a of said half portion 213 of the first noise insulating plate 35a engages one of the engaging portions 217a of said intervening portion 217. The engaging portion 215a of the half portion 215 of the second noise insulating plate 35b engages the other engaging portions 217b of the intervening portion 217, to connect the first noise insulating plate 35a to the second noise insulating plate 35b.

Figure 12A:
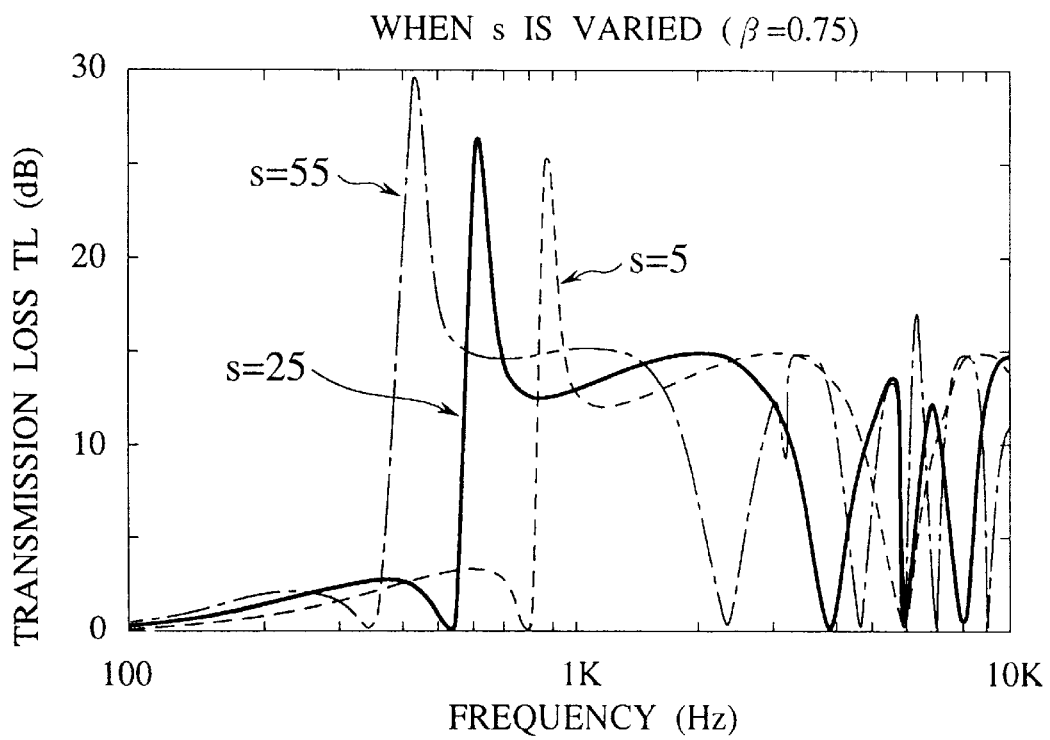
FIG. 12A is a graph showing the values of transmission loss with respect to the frequency of noise when the distance s is varied.
Figure 12B:
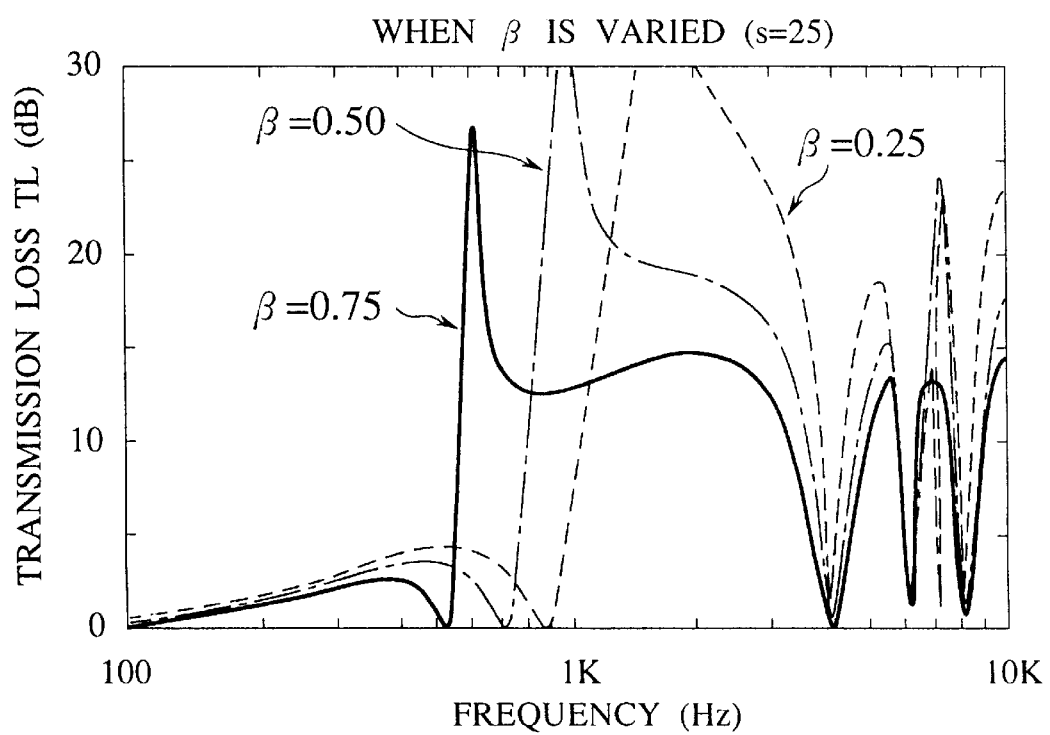
FIG. 12B is a graph showing the values of transmission loss with respect to the frequency of noise when the straight-tube ratio $\beta$ is varied.

In this configuration, by changing many intervening portions 217 having various lengthes s thereof, it is possible to set a distance d easily between the first noise insulating plate 35a and the second noise insulating plate 35b, and to get easily frequency characteristic that should be insulated. As shown in FIG. 12A, if the distance c is increased, it is possible to insulate low frequency noise. Moreover, since the engaging portion 217a and 217b of the intervening portion 217 has fitting construction, the intervening portion 217 can be changed easily. Therefore the number of the cylindrical portions 211 is changed easily. Consequently, it is possible to easily change the straight-tube ratio β according to necessary frequency characteristic. As shown in FIG. 12B, if the straight-tube ratio β is selected by selecting the number of the cylindrical portions 211, it is possible to get the necessary frequency characteristic to be insulated.

[Sixth Preferred Embodiment]

Figure 13A:
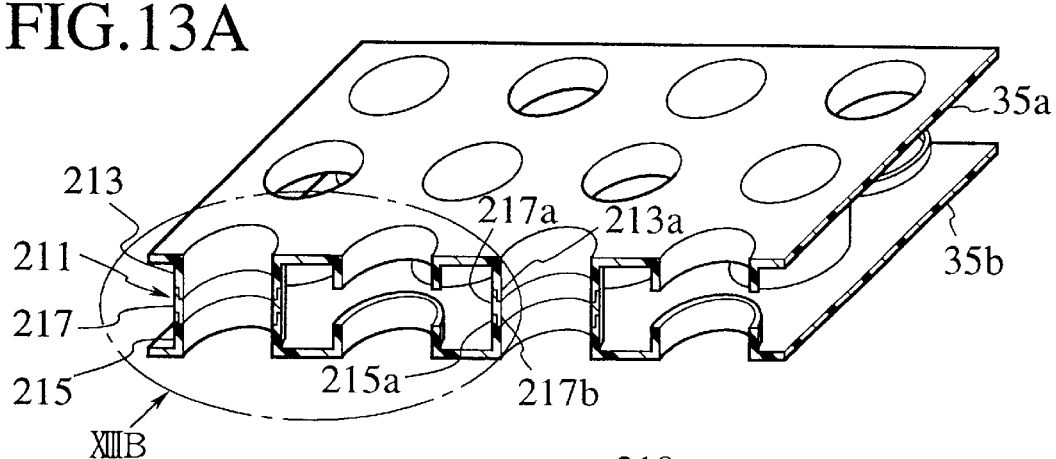
FIG. 13A is a perspective view of the sixth preferred embodiment of a noise insulating wall structure according to the present invention.
Figure 13B:
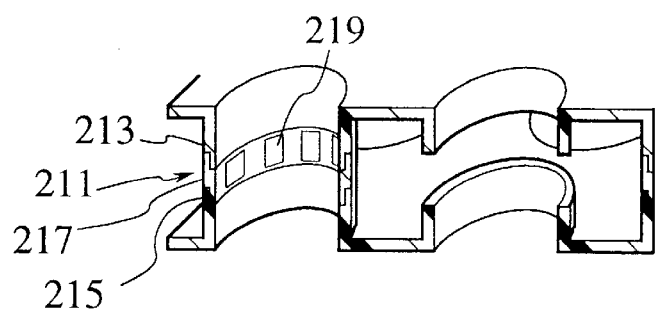
FIG. 13B is a sectional view of the noise insulating wall structure of FIG. 13A.

Referring to FIG. 13A and 13B, the sixth preferred embodiment of a noise insulating wall structure according to the present invention will be described bellow.

As shown in FIG. 13A and 13B, in a noise insulating wall of this preferred embodiment, the only construction that the intervening portion 217 have a plurality of opening 219 of rectangular shape formed at a side wall is different from the noise insulating wall of the fifth embodiment Therefore the same reference numbers will be used for the portions of the same constructions as those in the fifth embodiment, and the repeated descriptions will be omitted.

In this configuration, in addition to the same effect as those in the fifth embodiment, it is possible to easily change the straight-tube ratio β by preparing and using many intervening portions 217 that have various type of opening.

[Seventh Preferred Embodiment]

Figure 14A:
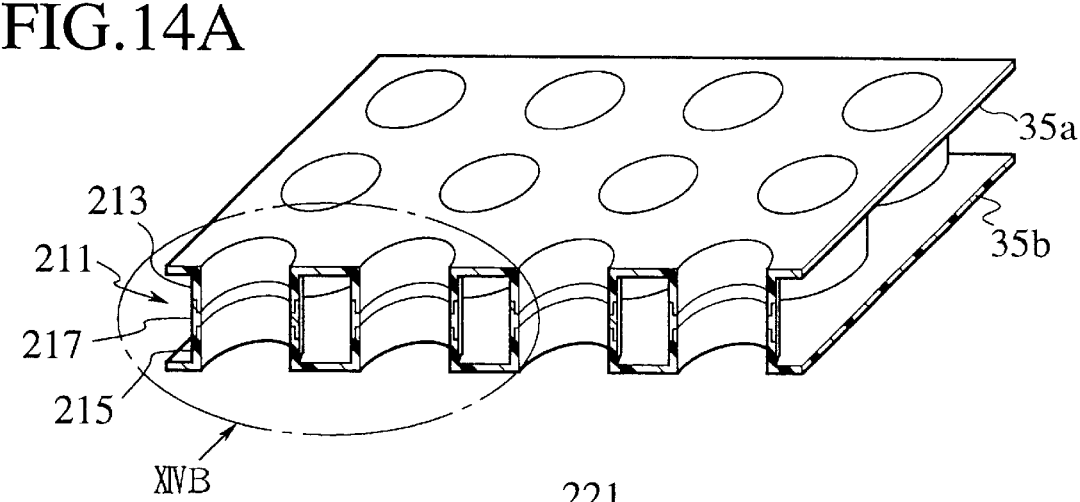
FIG. 14A is a perspective view of the seventh preferred embodiment of a noise insulating wall structure according to the present invention.
Figure 14B:
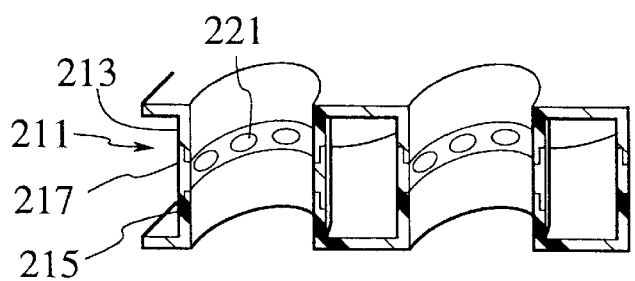
FIG. 14B is a sectional view of the noise insulating wall structure of FIG. 14A.

Referring to FIG. 14A, 14B, the seventh preferred embodiment of a noise insulating wall structure according to the present invention will be described bellow.

As shown in FIG. 14A, 14B, the opening 221 of this noise insulating wall is different from that of the sixth embodiment. This opening 221 has a oval shape, and this has a net or grid in it. In this configuration, since the opening 221 has a net or grid, a gravels or small stones is prevented from enterring.

In addition, it is possible to substitute porous material for the net and grid. In this configuration, it is possible to get the same effect as the net or grid.

Moreover it is possible to add water repellent finish to the porous material to repel water.

Next, the calculated result of FIG. 5 and the experiment result of FIG. 6 are shown in FIGS. 15A and 15B. As shown in these drawings, five holes are arranged in one block and four blocks are arranged in a test piece. In each block, the central hole in one block corresponds to reference number 61 in FIG. 4B and the surrounding four holes correspond to reference number 43. β=0.8 in FIG. 5, reference number 0 in FIG. 6 and reference number 45 in FIG. 3B correspond to no hole state.

Among FIG. 5 and FIG. 6, β=0.7625 in FIG. 5 and reference number 4 in FIG. 6, β=0.725 in FIG. 5 and reference number 8 in FIG. 6, β=0.6875 in FIG. 5 and reference number 12 in FIG. 6, and β=0.65 and reference number 15 in FIG. 6 correspond to each other, respectively. In this case, diameter of the hole corresponding to reference number 45 in FIG. 3B is φ1.

The experiment result of FIG. 6 is obtained with the following measuring way. As shown in FIG. 16, a wooden box 301 accommodates fibrous acoustic damping material (t=200 mm) 302 to be an anechoic chamber. An opening (200 mm×200 mm) 303 is formed at a part of the wooden box 301 and a test piece (200 mm×200 mm) 304 which is a resinous sample panel is arranged at the opening 303. A loudspeaker 305 is arranged out of the wooden box 301 and the loudspeaker 305 radiates spherical wave which is recognized as plane wave near the opening. Difference in sound pressure level at a microphone 306 between both cases with the test piece and none is recognized as transmission loss.

Computing data of FIG. 9 is the same as the standard data of FIGS. 15A and 15B. As the diameter of the hole corresponding reference number 45 of FIG. 3B gets greater, the corresponding β value gets greater.

Figures 17A, 17B:
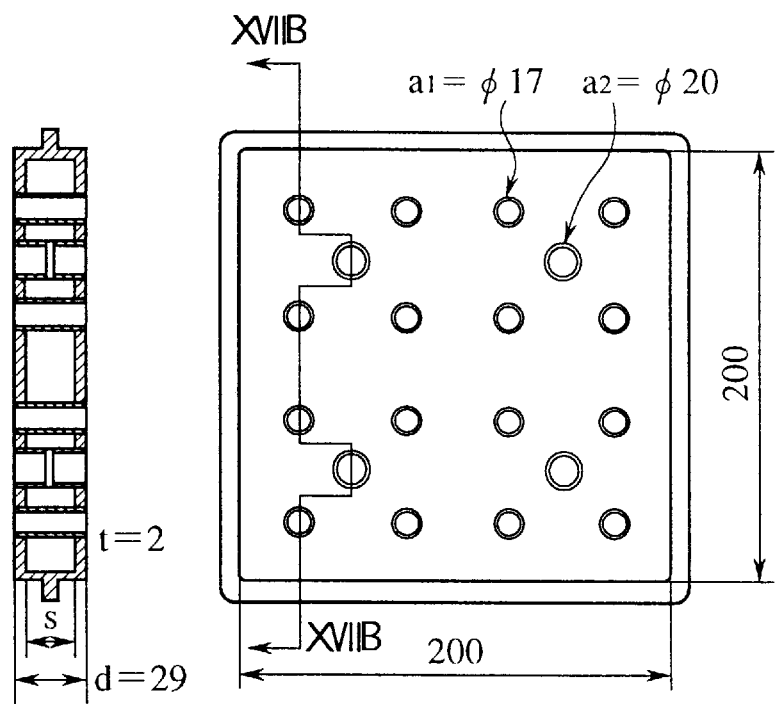
FIG. 17A shows a standard data for the experiment result of FIGS. 12A and 12B.
FIG. 17B is a cross sectional view taken along the line XVIIB—XVIIB in FIG. 17A.

A standard data for the solid line in FIGS. 12A and 12B are indicated in FIGS. 17A and 17B. s value in FIG. 12A corresponds 25 mm obtained by subtracting the plate thickness t (=2 mm) from the whole thickness d (=29 mm).

In addition, an unit of measure in FIGS. 15A to 17B is millimeter (mm). These structure includes four blocks composed of five cylinders consisting of one central cylinder and four peripheral cylinders. The central cylinder is closed at a middle portion thereof with a disk-like plate member.

What is claimed is:

1. A noise insulating wall structure comprising:

first and second noise insulating plates adjacent and spaced from each other;

first through holes formed in said first noise insulating plate and second through holes formed in said second noise insulating plate, said first and second through holes being aligned to form first and second pairs of through holes;

cylinders formed at said first pairs for establishing communication between said first through holes and said second through holes, said cylinders having a first half integral with said first noise insulating plate and having a first abutting portion on an end face thereof;

a second half integral with said second noise insulating plate and having a second abutting portion on an end face thereof; and a vibration varying system to adjust frequency characteristics of said cylinders such that waves transmitted through said first pair of through holes and waves transmitted through said second pair of through holes cancel each other out.

2. A noise insulating wall structure according to claim 1, wherein said first abutting portion abuts said second abutting portion; and said vibration varying system comprises first notches formed in said first abutting portion and second notches formed in said second abutting portion, said first and second notches establishing a communication between an interior and an exterior of said cylinder.

3. A noise insulating wall structure according to claim 2, wherein said notches are arranged symmetrically along a radial cross section of said cylinders.

4. A noise insulating wall structure according to claim 2, wherein said notches have a rectangular shape.

5. A noise insulating wall structure according to claim 2, wherein said notches extend in an axial direction of said cylinders.

6. A noise insulating wall structure according to claim 2, wherein said first and second notches are aligned with each other when said first and second abutting portions are connected.

7. A noise insulating wall structure according to claim 2, wherein a maximum noise frequency insulation is adjusted by varying at least one of the number, shape, size, and depth of said notches.

8. A noise insulating wall structure according to claim 2, wherein said first half and said second half have the same height and said first and second noise insulating plates have the same shape.

9. A noise insulating wall structure according to claim 1, wherein said vibration varying system has an intervening portion of a predetermined length interposed between said first and second halves such that a distance between said first noise insulating plate and said second noise insulating plate is determined by a length of said intervening portion.

10. A noise insulating wall structure according to claim 9, wherein a first engaging portion is arranged on said first abutting portion;

a second engaging portion is arranged on said second abutting portion; and said intervening portion has third and fourth engaging portions;

wherein said first engaging portion engages said third engaging portion and said second engaging portion engages said fourth engaging portion to connect said first noise insulating plate to said second noise insulating plate.

11. A noise insulating wall structure according to claim 10, wherein said intervening portion has a plurality of openings formed in a side wall thereof for establishing communication between an interior and an exterior of said intervening portion.

12. A noise insulating wall structure according to claim 11, wherein a maximum noise insulating frequency is adapted to a frequency suitable for insulating noise by varying at least one of the number, shape, size, and depth of said opening.

13. A noise insulating wall structure according to claim 1 further comprising:

cylinders formed at said second pairs for establishing communications between said first through holes and said second through holes, said cylinder having a first half integral with said first noise insulating plate and having a first abutting portion on an end face thereof;

a second half integral with said second noise insulating plate and having a second abutting portion on an end face thereof; and a vibration varying system to adjust frequency characteristics of said cylinders such that waves transmitted through said first pair of through holes and waves transmitted through said second pair of through holes cancel each other out.

14. A noise insulating wall structure according to claim 1, wherein said first and second noise insulating plates form an under cover of an engine compartment of an automotive vehicle.

15. An under cover structure of an engine compartment comprising a noise insulating wall structure comprising:

first and second noise insulating plates adjacent and spaced from each other;

first through holes formed in said first noise insulating plate and second through holes formed in said second noise insulating plate, said first and second through holes being aligned to form first and second pairs of through holes;

cylinders formed at said first pairs for establishing communication between said first through holes and said second through holes, said cylinders having a first half integral with said first noise insulating plate and having a first abutting portion on an end face thereof;

a second half integral with said second noise insulating plate and having a second abutting portion on an end face thereof; and a vibration varying system to adjust frequency characteristics of said cylinders such that waves transmitted through said first pair of through holes and waves transmitted through said second pair of through holes cancel each other out.

16. A noise insulating wall structure comprising:

a plurality of noise insulating plates arranged at intervals;

through holes formed in each of said plurality of noise insulating plates, through holes in one noise insulating plate being aligned with corresponding through holes in an adjacent noise insulating plate to form first and second pairs of through holes;

cylinders formed by said first pairs of through holes having
 a first half integral with one noise insulating plate and having a first abutting portion on an end face thereof;
 a second half integral with another noise insulating plate and having a second abutting portion on an end face thereof; and
 a vibration varying system to adjust frequency characteristics of said cylinders such that waves transmitted through said first pair of through holes and waves transmitted through said second pair of through holes cancel each other out.

17. A noise insulating wall structure according to claim 16, wherein said first abutting portion abuts said second abutting portion; and said vibration varying system comprises first notches formed in said first abutting portion and second notches formed in said second abutting portion, said first and second notches establishing a communication between an interior and an exterior of said cylinder.

18. A noise insulating wall structure according to claim 17, wherein said notches are arranged symmetrically along a radial cross section of said cylinders.

19. A noise insulating wall structure according to claim 17, wherein said notches have a rectangular shape.

20. A noise insulating wall structure according to claim 17, wherein said notches extend in an axial direction of said cylinders.

21. A noise insulating wall structure according to claim 17, wherein said first and second notches are aligned with each other when said first and second abutting portions are connected.

22. A noise insulating wall structure according to claim 17, wherein a maximum noise frequency insulation is adjusted by varying at least one of the number, shape, size, and depth of said notches.

23. A noise insulating wall structure according to claim 17, wherein said first half and said second half have the same height and said noise insulating plates have the same shape.

24. A noise insulating wall structure according to claim 16, wherein said vibration varying system has an intervening portion of a predetermined length interposed between said first and second halves such that a distance between said noise insulating plates is determined by a length of said intervening portion.

25. A noise insulating wall structure according to claim 24, wherein a first engaging portion is arranged on said first abutting portion;

a second engaging portion is arranged on said second abutting portion; and said intervening portion has third and fourth engaging portions;

wherein said first engaging portion engages said third engaging portion and said second engaging portion engages said fourth engaging portion to connect said noise insulating plates.

26. A noise insulating wall structure according to claim 25, wherein said intervening portion has a plurality of openings formed in a side wall thereof for establishing communication between an interior and an exterior of said intervening portion.

27. A noise insulating wall structure according to claim 26, wherein a maximum noise insulating frequency is adapted to a frequency suitable for insulating noise by varying the number, shape, size, or depth of said opening.

28. A noise insulating wall structure according to claim 16, further comprising:

cylinders formed at said second pairs for establishing communications between said first through holes and said second through holes, each cylinder having
 a first half integral with said one noise insulating plate and having a first abutting portion on an end face thereof;
 a second half integral with said another noise insulating plate and having a second abutting portion on an end face thereof; and
 a vibration varying system to adjust frequency characteristics of said cylinders such that waves transmitted through said first pair of through holes and waves transmitted through said second pair of through holes cancel each other out.

29. A noise insulating wall structure according to claim 16, wherein said noise insulating plates form an under cover of an engine compartment of an automotive vehicle.

30. An under cover structure of an engine compartment comprising a noise insulating wall structure comprising:

a plurality of noise insulating plates arranged at intervals;

through holes formed in each of said plurality of noise insulating plates, through holes in one noise insulating plate being aligned with corresponding through holes in an adjacent noise insulating plate to form first and second pairs of through holes;

cylinders formed by said first pairs of through holes having
 a first half integral with one noise insulating plate and having a first abutting portion on an end face thereof;
 a second half integral with another noise insulating plate and having a second abutting portion on an end face thereof; and
 a vibration varying system to adjust frequency characteristics of said cylinders such that waves transmitted through said first pair of through holes and waves transmitted through said second pair of through holes cancel each other out.

31. A noise insulating wall structure according to claim 1, wherein said structure includes a plural blocks composed of said plural cylinders consisting of a central cylinder and peripheral cylinders, said central cylinder being closed at a middle portion thereof.

32. A noise insulating wall structure according to claim 16, wherein said structure includes a plural blocks composed of said plural cylinders consisting of a central cylinder and peripheral cylinders, said central cylinder being closed at a middle portion thereof.

* * * * *